DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 14, 1973

913 O.G. 392

T913,004

ELECTRICAL WINDING WITH COOLING PASSAGES AND METHOD OF FABRICATING THE SAME

Thomas J. Fagan, Jr., Pittsburgh, Pa., assignor to Westinghouse Electric Corporation, Pittsburgh, Pa.

Filed Nov. 16, 1972, Ser. No. 307,315
Int. Cl. H01f 7/22
U.S. Cl. 335—216
1 Sheet Drawing. 10 Pages Specification

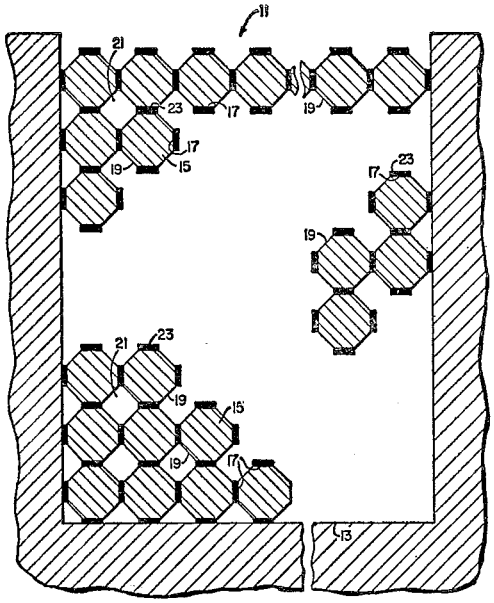

Individual wires in a winding are formed as polygons having contacting faces and noncontacting faces. Contacting faces of adjacent wires are positively engaged, while the noncontacting faces of adjacent wires form the periphery of openings that extend through the winding. Insulation may be removed from the noncontacting faces to facilitate cooling.

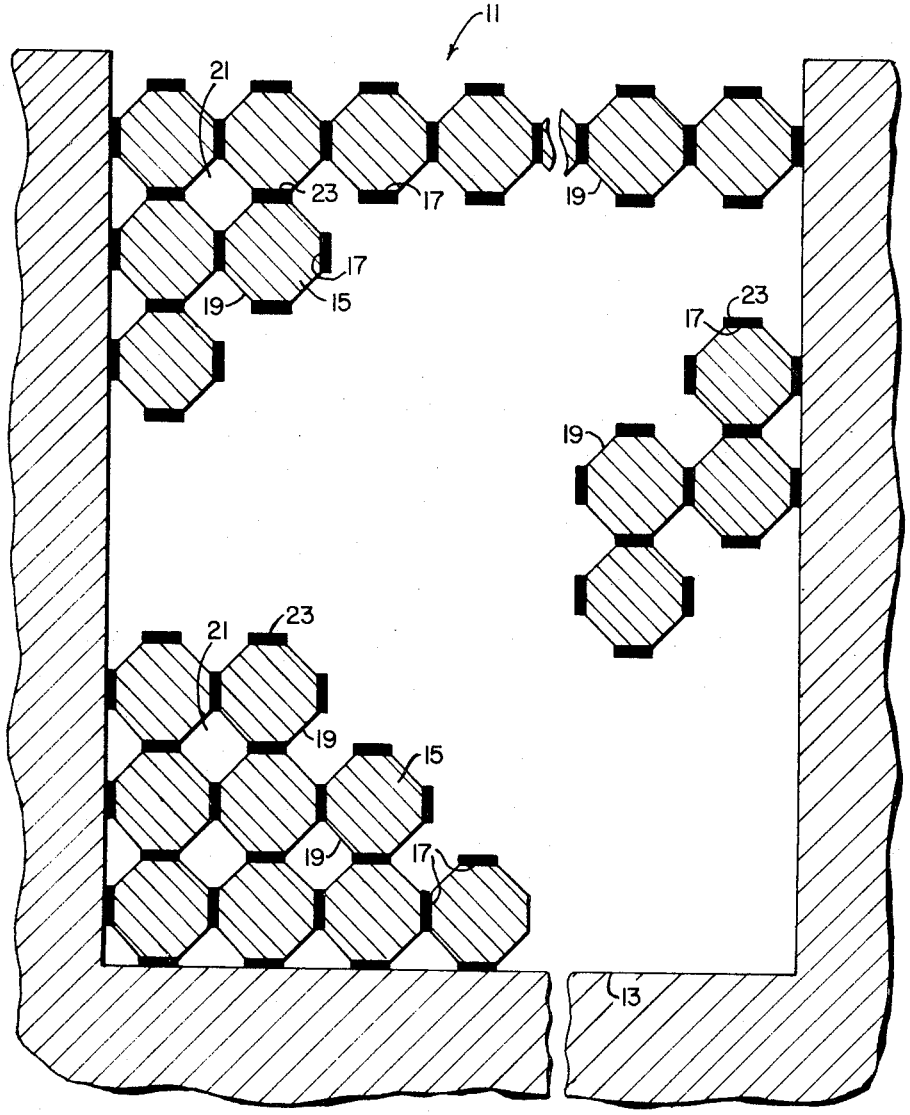

ELECTRICAL WINDING WITH COOLING PASSAGES
AND METHOD OF FABRICATING THE SAME
Filed Nov. 16, 1972